United States Patent
Burhop et al.

(10) Patent No.: US 9,844,917 B2
(45) Date of Patent: Dec. 19, 2017

(54) SUPPORT STRUCTURES FOR ADDITIVE MANUFACTURING OF SOLID MODELS

(71) Applicant: Siemens Product Lifecycle Management Software Inc., Plano, TX (US)

(72) Inventors: Mark R. Burhop, Ewing, NJ (US); David Madeley, Louth (GB); Suraj Musuvathy, Princeton, NJ (US); Erhan Arisoy, Princeton, NJ (US); Edward Slavin, Robbinsville, NJ (US); Hasan Bank, Princeton, NJ (US)

(73) Assignee: Siemens Product Lifestyle Management Inc., Plano, TX (US)

(*) Notice: Subject to any disclaimer, the term of this patent is extended or adjusted under 35 U.S.C. 154(b) by 279 days.

(21) Appl. No.: 14/554,483

(22) Filed: Nov. 26, 2014

(65) Prior Publication Data

US 2015/0360421 A1   Dec. 17, 2015

Related U.S. Application Data

(60) Provisional application No. 62/011,932, filed on Jun. 13, 2014.

(51) Int. Cl.
*G06F 19/00* (2011.01)
*B29C 67/00* (2017.01)
(Continued)

(52) U.S. Cl.
CPC ........ *B29C 67/0092* (2013.01); *B29C 64/135* (2017.08); *B29C 64/386* (2017.08);
(Continued)

(58) Field of Classification Search
CPC . B29C 67/02; B29C 67/0066; B29C 67/0088; B33Y 50/02; B33Y 10/00;
(Continued)

(56) References Cited

U.S. PATENT DOCUMENTS

| | | | |
|---|---|---|---|
| 4,999,143 | A | 3/1991 | Hull et al. |
| 5,017,317 | A | 3/1991 | Marcus |

(Continued)

FOREIGN PATENT DOCUMENTS

| | | |
|---|---|---|
| EP | 0655317 A1 | 5/1995 |
| EP | 0666163 A2 | 8/1995 |
| WO | 02/00963 A1 | 1/2002 |

OTHER PUBLICATIONS

Hur et al., Efficient Algorithm for Automatic Support Structure Generation in Layered Manufacturing, Proceedings of the 1996 ASME Design Engineering Technical Conferences and Computer in Engineering Conference Aug. 18-22, 1996, Irvine CA. pp. 1-10.*

(Continued)

*Primary Examiner* — Ziaul Karim
*Assistant Examiner* — Joshua Sanders

(57) ABSTRACT

Systems and methods for support structures for additive manufacturing of solid models. A method includes receiving a solid model, for a physical object to be manufactured, that includes a plurality of boundary representation surfaces. The method includes analyzing the b-rep surfaces to generate point samples for potential support locations. The method includes clustering points on the solid model, corresponding to at least some of the point samples, to create support locations. The method includes generating column supports in the solid model that connect to the original solid model at the support locations. The method includes storing the solid model, including the column supports.

14 Claims, 7 Drawing Sheets

(51) Int. Cl.

| | | |
|---|---|---|
| *G06F 17/50* | (2006.01) | |
| *G05B 19/4097* | (2006.01) | |
| *B33Y 50/02* | (2015.01) | |
| *G05B 19/4099* | (2006.01) | |
| *B29C 64/135* | (2017.01) | |
| *B29C 64/386* | (2017.01) | |
| *B29C 64/40* | (2017.01) | |
| *B33Y 10/00* | (2015.01) | |
| *B33Y 30/00* | (2015.01) | |

(52) U.S. Cl.
CPC .............. *B29C 64/40* (2017.08); *B33Y 50/02* (2014.12); *G05B 19/4097* (2013.01); *G05B 19/4099* (2013.01); *G06F 17/50* (2013.01); *B33Y 10/00* (2014.12); *B33Y 30/00* (2014.12); *G05B 2219/49023* (2013.01); *G05B 2219/49038* (2013.01); *G06F 2217/12* (2013.01); *Y02P 90/265* (2015.11)

(58) Field of Classification Search
CPC  B33Y 30/00; G05B 19/4097; G05B 19/4099; G05B 2219/49023; G05B 2219/49038; G05F 2217/12
USPC ......................................................... 700/119
See application file for complete search history.

(56) References Cited

U.S. PATENT DOCUMENTS

| | | | |
|---|---|---|---|
| 5,015,424 A | 5/1991 | Smalley | |
| 5,184,307 A | 2/1993 | Hull et al. | |
| 5,216,616 A | 6/1993 | Masters | |
| 5,321,622 A | 6/1994 | Snead et al. | |
| 5,402,351 A * | 3/1995 | Batchelder | B29C 41/36 264/401 |
| 5,572,431 A | 11/1996 | Brown et al. | |
| 5,595,703 A | 1/1997 | Swaelens et al. | |
| 5,718,279 A * | 2/1998 | Satoh | B29C 33/3807 164/15 |
| 5,897,825 A | 4/1999 | Fruth et al. | |
| 5,943,235 A | 8/1999 | Earl et al. | |
| 6,132,667 A | 10/2000 | Beers et al. | |
| 6,270,335 B2 | 8/2001 | Leyden et al. | |
| 6,471,800 B2 | 10/2002 | Jang et al. | |
| 6,676,892 B2 | 1/2004 | Das et al. | |
| 6,682,684 B1 | 1/2004 | Jamalabad et al. | |
| 6,797,351 B2 | 9/2004 | Kulkarni et al. | |
| 6,823,230 B1 | 11/2004 | Jamalabad et al. | |
| 6,907,307 B2 | 6/2005 | Chen et al. | |
| 7,917,243 B2 | 3/2011 | Kozlak et al. | |
| 7,930,054 B2 | 4/2011 | Slaughter et al. | |
| 8,046,097 B2 | 10/2011 | Hull et al. | |
| 8,318,076 B2 | 11/2012 | Wang et al. | |
| 8,610,027 B2 | 12/2013 | Hovel et al. | |
| 2004/0015254 A1 | 1/2004 | Vancraen et al. | |
| 2005/0154481 A1* | 7/2005 | Berger | G06T 19/20 700/98 |
| 2005/0263077 A1 | 12/2005 | Ganapathisubramanian et al. | |
| 2007/0225856 A1 | 9/2007 | Slaughter et al. | |
| 2009/0072447 A1 | 3/2009 | Hull et al. | |
| 2009/0263624 A1 | 10/2009 | Illston | |
| 2010/0028645 A1 | 2/2010 | Maguire et al. | |
| 2010/0228369 A1 | 9/2010 | Eggers et al. | |
| 2011/0178621 A1 | 7/2011 | Heide | |
| 2012/0308805 A1 | 12/2012 | Sella | |
| 2013/0066812 A1 | 3/2013 | Nehme et al. | |
| 2013/0124151 A1 | 5/2013 | Mech et al. | |
| 2013/0256953 A1 | 10/2013 | Teulet | |
| 2013/0312928 A1 | 11/2013 | Mercelis et al. | |
| 2013/0313743 A1 | 11/2013 | Rockhold | |
| 2014/0300017 A1* | 10/2014 | Wighton | B29C 67/0092 264/40.1 |
| 2015/0066178 A1* | 3/2015 | Stava | B29C 67/0088 700/98 |

OTHER PUBLICATIONS

PCT Search Report dated Sep. 3, 2015, for Application No. PCT/US2015/035230, 12 pages.

* cited by examiner

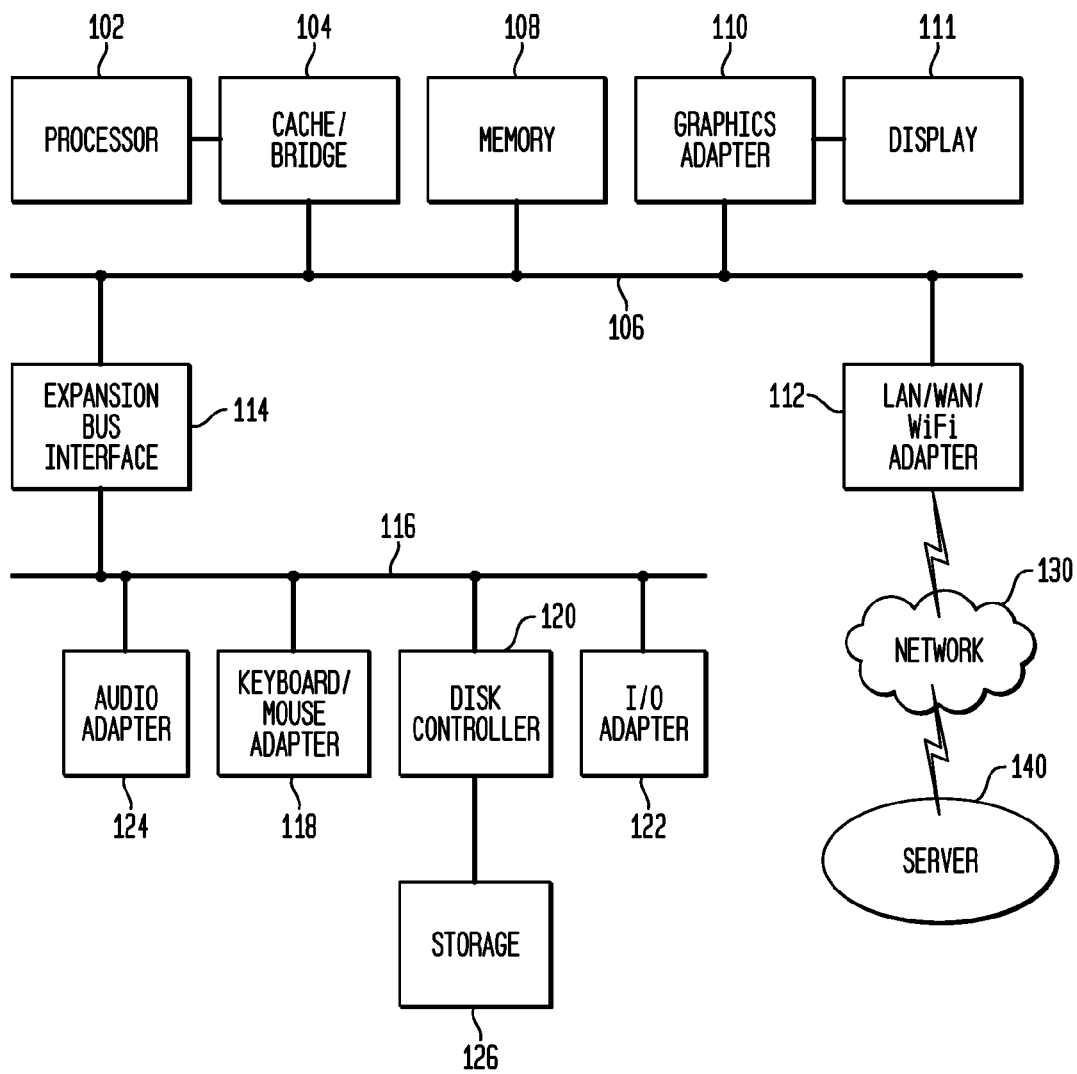

STRESS CONCENTRATION
510
512

520
522
STRESS CONCENTRATION

530
STRESS CONCENTRATION
532

SUPPORT STRUCTURES FOR ADDITIVE MANUFACTURING OF SOLID MODELS

CROSS-REFERENCE TO RELATED APPLICATION

This application claims the benefit of the filing date of U.S. Provisional Patent Application 62/011,932, filed Jun. 13, 2014, which is hereby incorporated by reference.

TECHNICAL FIELD

The present disclosure is directed, in general, to computer-aided design, visualization, and manufacturing systems ("CAD/CAM systems"), product lifecycle management ("PLM") systems, and similar systems, that manage data for products and other items (collectively, "Product Data Management" systems or PDM systems).

BACKGROUND OF THE DISCLOSURE

Support structures are additional scaffold type structures required to ensure successful additive manufacturing of parts using technologies such as Fused Deposition Modeling (FDM) or stereolithography. A part is typically defined using solid models in a computer-aided design (CAD) system and prepared for fabrication using a computer-aided manufacturing (CAM) system. Current commercial CAD/CAM systems do not have sufficient functionality for creating support structures for additive manufacturing of solid models. Improved systems are desirable.

SUMMARY OF THE DISCLOSURE

Various disclosed embodiments include methods and systems for enabling users of commercial CAD/CAM systems to create and modify support structures within the same system used to define part geometry and generate manufacturing operations. The supports may be generated directly on solid models, thereby avoiding the need for data or geometry translation. The supports may be created using the User Defined Feature functionality of the NX CAD/CAM system, such as that available from Siemens Product Lifecycle Management Software Inc. (Plano, Tex.), thereby enabling easy modification and archiving within the CAD/CAM system itself.

Other embodiments include systems and methods for support structures for additive manufacturing of solid models. A method includes receiving a solid model, for a physical object to be manufactured, that includes a plurality of boundary representation (b-rep) surfaces. The method includes analyzing the b-rep surfaces to generate point samples for potential support locations. The method includes clustering points on the solid model, corresponding to at least some of the point samples, to create support locations. The method includes generating column supports in the solid model that connect to the original solid model at the support locations. The method includes storing the solid model, including the column supports.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 1 illustrates a block diagram of a data processing system in which an embodiment can be implemented;

DETAILED DESCRIPTION

Figure 2A:
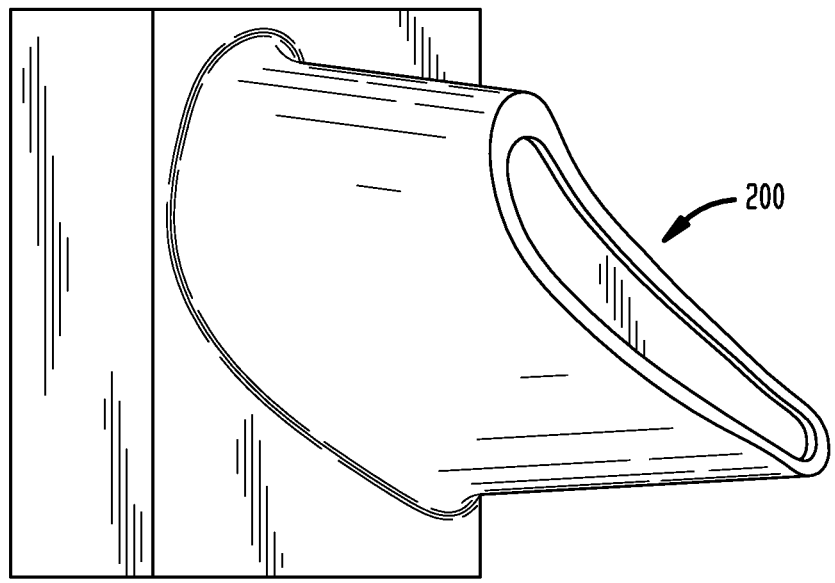
FIG. 2A illustrates an example of original geometry to be additively manufactured in accordance with disclosed embodiments.

FIGS. 1 through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Additive Manufacturing (also referred to herein as "AM" or "3D printing") is a fabrication technique in which a solid physical object is built additively in layers, typically from the build plate up. The "build plate" is also referred to herein as the printer base, bed, or as the contact build plate. As such, these systems ideally have a means for supporting free standing regions facing opposite to the build direction. These structures are also required to keep all features of a part in place during the fabrication process to avoid any structural distortions. This is done by using "support structures," which are additional scaffold type structures that support these regions and ensure successful additive manufacturing of parts using technologies such as FDM or stereolithography. A part is typically defined using solid models in a CAD system and prepared for fabrication using a CAM system. Current commercial CAD/CAM systems do not have sufficient functionality for creating support structures for additive manufacturing of solid models.

In the majority of cases, solid models are exported into independent software packages for creating support geometry. The solids can be first converted to polygonal meshes during the export or within the independent software packages, resulting in loss of accuracy, data translation issues, and increased workflow complexities for end users of additive manufacturing technology. Embodiments for, among other things, enabling users of commercial CAD/CAM systems to create and modify support structures within the same system used to define part geometry and generate manufacturing operations are illustrated herein. The supports are generated directly on solid models, thereby avoiding the need for data or geometry translation.

In one illustrative embodiment, the supports are creating using a "user defined feature" functionality of the CAD/CAM system, thereby enabling easy modification and archiving within the CAD/CAM system itself. The user defined feature is an entity within the CAD application that allows the creation of standard features that can be easily parameterized and reused in a design and managed by an organization in libraries. Illustrated embodiments create support structures that fulfill the dual (and sometimes contradictory) purposes of properly supporting the weight of the part during fabrication and that are easy to remove after fabrication is finished. Additionally, this approach allows the user to refine and edit the support structures after generation through parameterizations of the support geometry as they would any other geometry in their CAD/CAM environment, among other benefits. Furthermore, using user defined features allows the support geometry to be created with rules in such a way that if the part geometry is modified, the support geometry can adapt to these modifications based on their rules and parameterizations, a unique feature to this approach.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Parts of the geometry intended to be additive manufactured ideally are supported or otherwise held in place during the fabrication process. Initially, an additively manufactured design is supported by a bed or build plate to which the material attaches. Later layers attach to previous layers.

For some geometry, it may not be possible to attach it to either the bed or previously created layers of the geometry so some type of support may need to be constructed. This support is removed after the final design is completed.

FIG. 2A illustrates an example of original geometry 200 to be additively manufactured. Note that if this geometry is printed from the bottom to the top, using typical techniques, the original geometry 200 has no support for the bottom-most portion, and so it cannot be successfully manufactured.

Figure 2B:
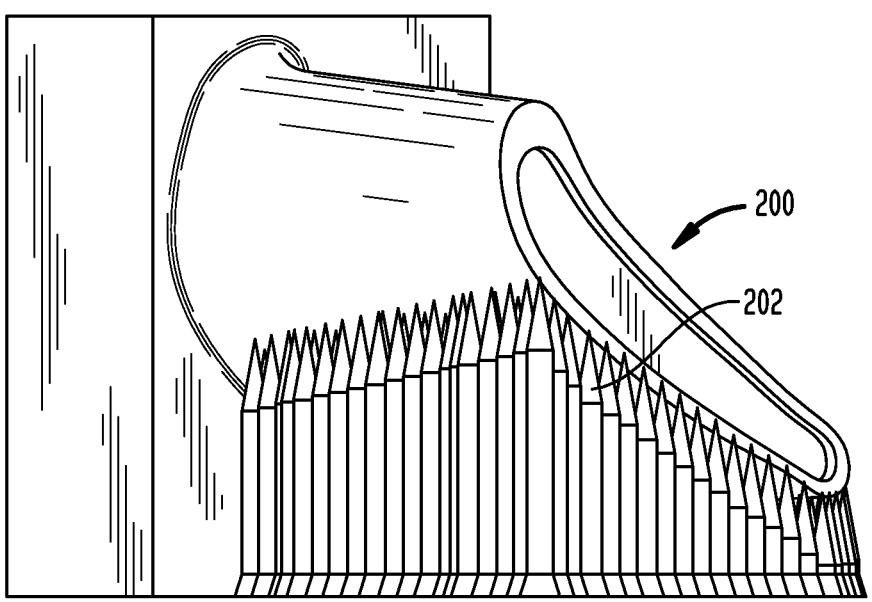
FIG. 2B illustrates an example of original geometry to be additively manufactured including support structures as disclosed herein.

FIG. 2B illustrates an example of original geometry 200 to be additively manufactured including support structures 202 as disclosed herein. Support structures 202 are also printed from the bottom up and provide support for geometry 200 to be printed. Note that each of the support structures 202 narrows to a point where it contacts original geometry 200 to allow them to be easily detached and cause as little modification to the bottom surface of geometry 200 as possible.

Various disclosed embodiments use manifold solid modeling geometry to define and construct supports that can keep material in place as it is added or deposited onto the final design. These supports can be easily removed as a post processing step after manufacturing is complete. Supports as disclosed herein can minimize the contact with the part to avoid marring or other disfiguring of the part, minimize the material use in the support, and minimize the construction time of the part.

Geometric representation and geometric computations can use highly precise boundary representation (b-rep) solid geometry such as that found in Siemens Parasolid geometric kernel, available from Siemens Product Lifecycle Management Software Inc. (Plano, Tex.).

Figure 3:
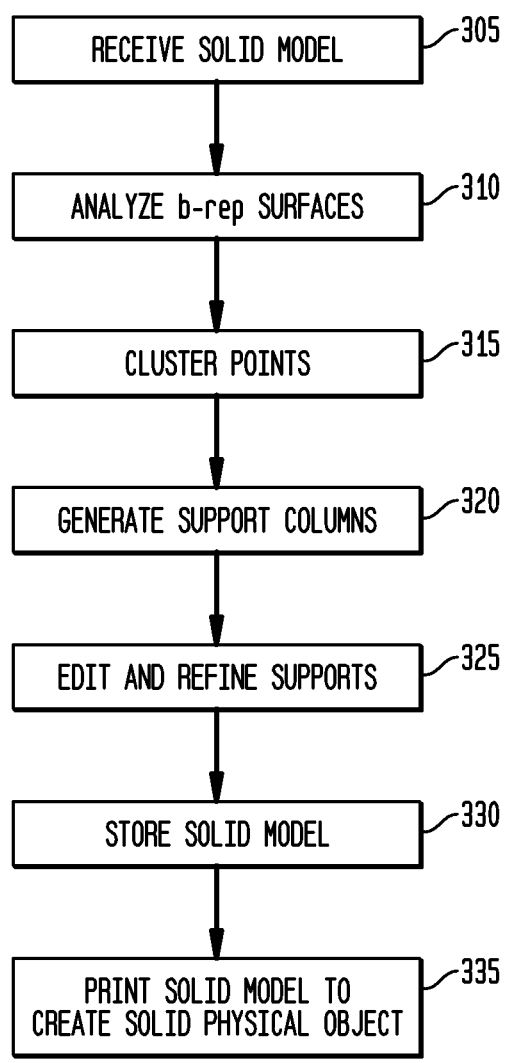
FIG. 3 illustrates a flowchart of a process in accordance with disclosed embodiments.

FIG. 3 illustrates a flowchart of a process in accordance with disclosed embodiments. This flowchart illustrates a method 300 that can be performed by a data processing system such as data processing system 100, referred to generically below as the "system."

The system receives a solid model, for an object to be manufactured, that includes a plurality of b-rep surfaces (305). "Receiving," as used herein, can include loading from storage, receiving from another device, receiving via an interaction with a user, or otherwise.

The system analyzes the B-Rep surfaces to generate point samples for potential support locations (310). As part of this analysis, the system examines the B-Rep surface's curvature and angle to determine the best place to place a support point or points.

The system clusters points on the solid model, corresponding to at least some of the point samples, to create support locations (315). Clustering, as used here, means that one or more points are identified for each support location; in some cases, where multiple point samples are found in proximity to each other, a single support location is used for this "cluster" of points.

The system generates column supports in the solid model that connect to the original solid model at the support locations (320). According to various embodiments, the system can automatically adjust the column supports according to changes in the solid model. In various embodiments, generated column supports are shaped to have minimum contact with the solid model at the support locations such that the required weight can be supported by the column support and can be easily removed without marring or damaging the surface of the object to be manufactured. The system can generate the column supports at locations and angles designed to minimize collisions with the solid model and the contact build plate. The system can generate the support columns such that the stress concentration of the solid model for the support columns is maximized and minimized to control bending and breaking of the support columns.

The system can interact with a user to edit and refine the supports (325).

The system stores the solid model including the column supports (330).

The system can print the solid model to create a physical object (335). This can be performed, for example, by the system communicating with a 3D printer to print the solid model.

Disclosed embodiments attempt to minimize contact between the solid model and the support structures, while accounting for lateral, direct, and twisting stress concentrations at the contact points.

Additive manufacturing tool users may desire easy removal of the support material following fabrication. Disclosed embodiments can create stress concentrations that cause any bending or breaking to occur at the location where the support touches the part. Support at a single point for each support structure provides the greatest stress concentration and allows twisting and bending at any direction. A linear contact provides a much greater level of support but can only be bent in one direction, and can only be used where the geometry provides a "flat" location.

Figure 4:
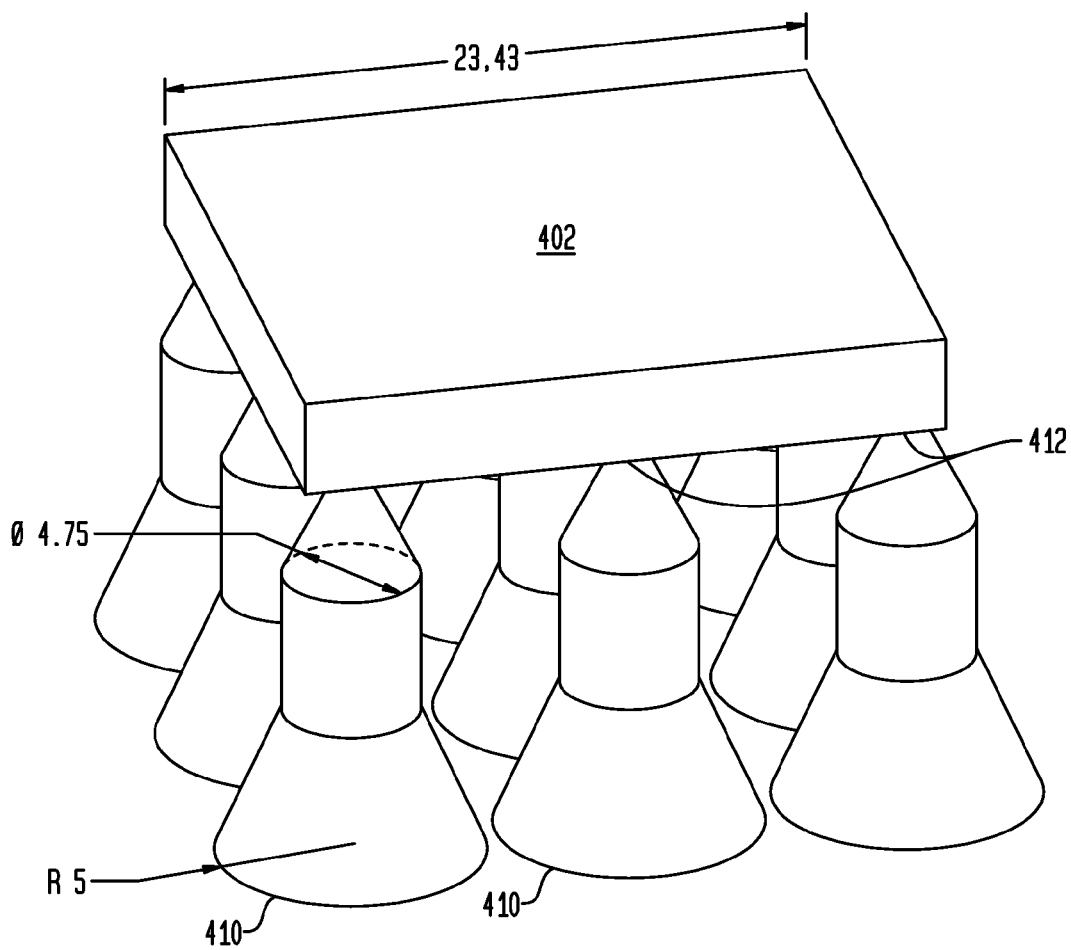
FIG. 4 illustrates a small test plate supported by column supports, each contacting the plate at a single point, in accordance with disclosed embodiments.

FIG. 4 illustrates a small test plate 402 supported by nine "column supports" 410, each contacting the plate at a single point 412. A single point of contact between model and each support is ideal for removing the support. However, if the support geometry spans multiple points, the rotational degrees of freedom are reduced and the ability to create the stress concentration in any direction is also affected. For this reason, supporting each point with its own column provides an optimum solution with two points being better than additional points (that are not on a line).

The system can balance the desire for individual, single-point support columns with other requirements for an optimum solution. There may be limits on the physical size of the column or the need to reduce the number of columns to reduce total material use. The columns created by this system may be merged or "booleaned" as required.

The column may be built in any direction subject to the limitations of the additive manufacturing hardware. Ideally, the column will be straight down (or up with some machines) to the bed of the machine. However, there are times when a different direction is needed with the maximum angle depending on the AM machine. For example, FDM machines can typically create geometry that has up to a 45 degree overhang without needing supports. The support columns themselves can then be built up to a 45 degree angle.

Disclosed embodiments can support columns of any shape For example, the column support 410 is shaped as a column of a cone, cylinder, and another cone; numerous columns of different shapes that fulfill the criteria above are contemplated.

According to disclosed embodiments, the initial cone touches the surface of the part at the point to be supported. A cylinder is then projected from the base of the cone to the base or build plate of the printer. To maximize adhesion to the base, a second cone with its base coplanar with the extrusion and bed is created and "booleaned" with the column. This second cone has a base radius that is larger than the radius of the cylinder, as illustrated by column support 410.

Figure 5A:
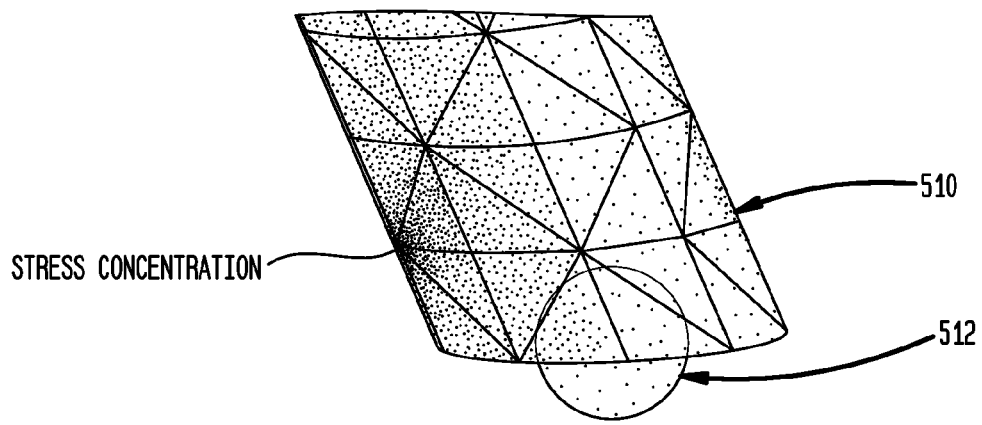
FIGS. 5A-5C illustrate different support structure shapes in accordance with disclosed embodiments.
Figure 5B:
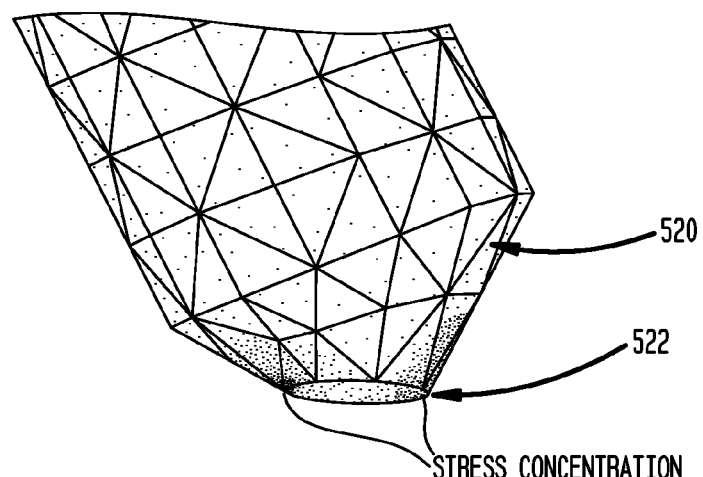
Figure 5C:
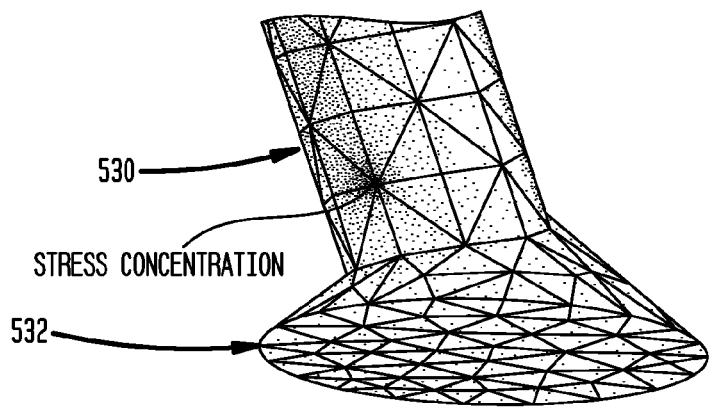

FIGS. 5A-5C illustrate different support structure shapes. FIG. 5A illustrates a column 510 attached at the base, which is represented by half sphere 512.

FIG. 5B illustrates a column 520 with smaller base 522. This creates a stress concentration at the base that makes it very easy for it to break off of the printer platform. This example would be most likely to become "unstuck" from the printer platform.

FIG. 5C a support column 530 that has a cone shape booleaned with a cylinder base, such as a "pad" 532 on the bottom. Such a shape produces less stress where the pad touches the printer base. There are two exceptions to this. In some cases, the height of the first cone is actually greater than the distance from the support point to the bed. In this case, only the part of the cone that is needed is used and no cylinder or second cone is created. The second exception is when the support base attaches to the model and not the printer bed. In this case, no second cone is used and a smaller (not larger) base may be substituted. This is to create stress concentrations to allow the support to be easily removed.

Disclosed embodiments can also perform collision avoidance when creating support structures. Supports built on top of existing geometry can be an issue in certain cases. For example, a support structure requires a connection to the model strong enough not be disconnected during the manufacturing process. However, this stronger connection also makes them harder to remove after the model is complete. Further, contact with the model can mar or otherwise disfigure the model surface resulting in less attractive models and greater post processing time.

For these reasons, it is often desirable to create supports which maximize the connection to the printer platform and minimize connections to the actual geometry to be printed.

Figure 6:
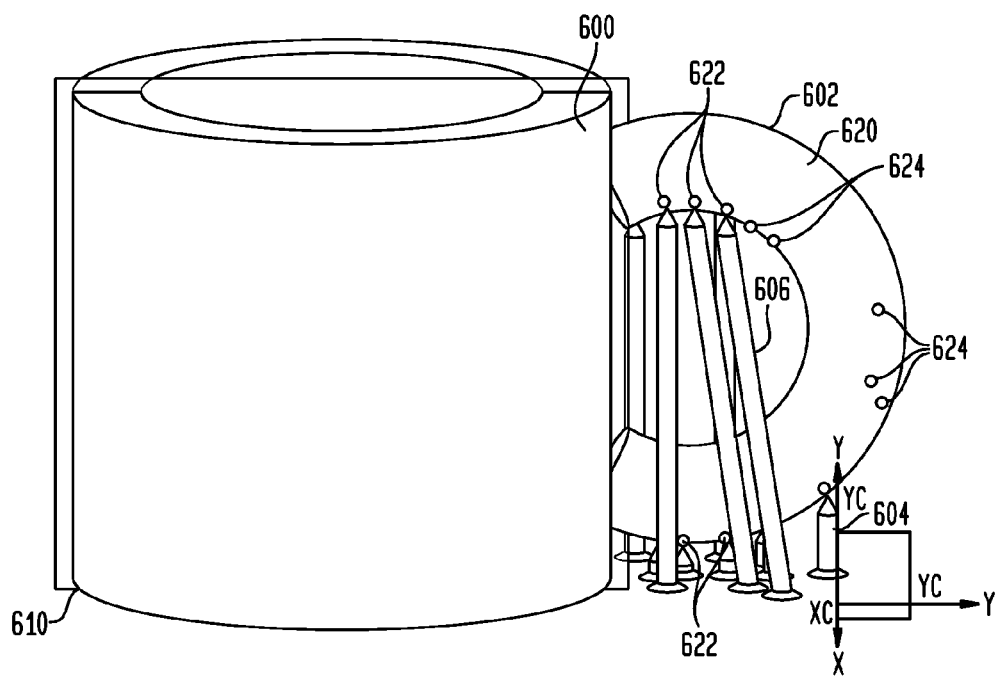
FIG. 6 illustrates an example of collision avoidance in accordance with disclosed embodiments.

FIG. 6 illustrates an example of collision avoidance, where the handle 602 of a mug solid model 600 requires supports. Column supports 604 for the bottom of the handle can go directly to the printer platform or contact build plate 610. However, column supports 606 on the top part of the handle angle out so as to avoid colliding with the handle bottom. Thus, the top handle supports 606 avoid collision with bottom of the mug handle 602. This example is also used to illustrate b-rep surfaces 620 and the point samples 624 (shown as exaggerated circles) on the b-rep surface 620 that can be clustered and used as support locations 622.

Identification of the ideal direction can be done by projecting the column 2D profile through space to determine if it intersects with other the geometry. One disclosed technique starts projecting a column "straight down" from the support location to the printer base, and testing for collisions with the solid model or other support structures. Then, the system "spirals" out from there, projecting a column in each direction and testing for collisions with the solid model or other support structures.

Figure 7:
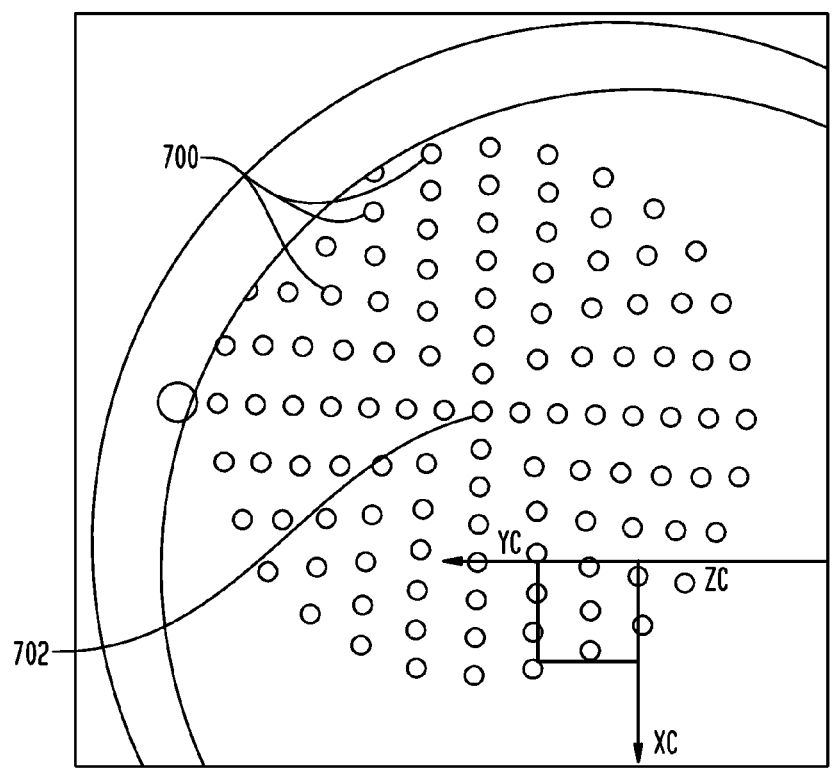
FIG. 7 illustrates an example of searching a collision-avoidance projection pattern in accordance with disclosed embodiments.

FIG. 7 illustrates an example of searching a collision-avoidance projection pattern 700 in accordance with disclosed embodiments. The center 702 is the first attempt with all other attempts spiraling out from the center, for example in the projection pattern 700. When a non-colliding support column projection is found, this results in a minimum column angle (from straight down) that does not hit the geometry. Since the pattern search can be stopped when a non-colliding support column projection is found, a typical case will not actually make a projection at all possible points in the example pattern.

Figure 8A:
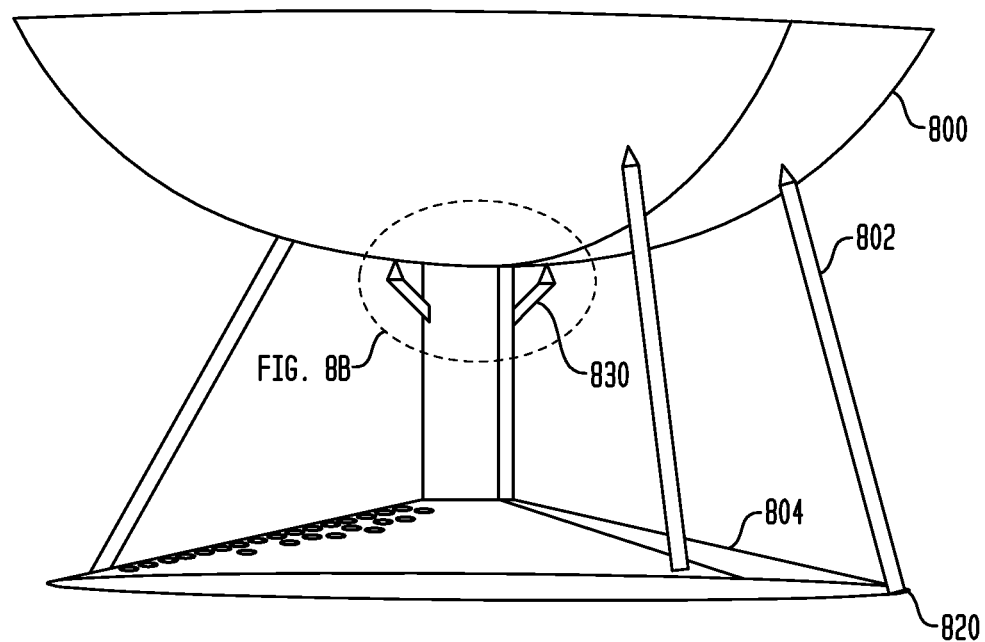
FIGS. 8A and 8B illustrate that outer support locations can angle out to miss the geometry of the solid model, in accordance with disclosed embodiments.
Figure 8B:
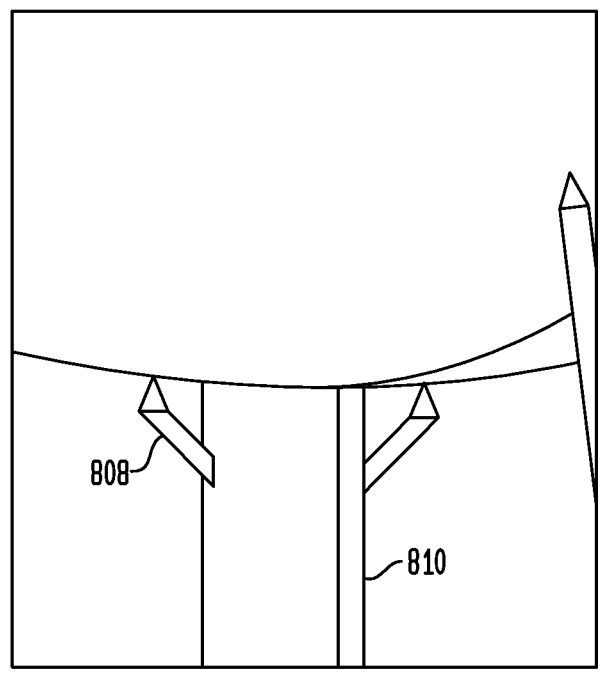

FIGS. 8A and 8B illustrate that outer support locations can angle out to miss the geometry of the solid model 800. In this example, an outer support 802 angles out to reach printer base 820 without colliding with the solid model's base 804.

FIG. 8B illustrates area 830 of FIG. 8A in more detail. FIG. 8B illustrates that, because an inner support 808 cannot reach the printer base 820, because it would be too great of an angle, the system can instead attach inner support 808 to the "stem" 810 of solid model 800.

The system analyzes the b-rep geometry of the solid model to determine support point locations. The location on the geometry to create the support relies on analysis of the B-rep surfaces that make up the geometry to be printed. The surfaces corresponding to all the faces of the geometry are analyzed. Those regions where the surface normal is within a certain angular range defined by the build direction are extracted. A number of representative point locations are computed on the extracted regions. The top cones of the support column structures will contact the surface at these locations.

The point locations are optimized based on a number of factors, such as the spacing between the points, the curvature of the surface, the local minimum and maximums of the surface slope, and a desire to cluster similar points, such as those that are on a line for a "line support".

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method performed by a data processing system for generating support structures in a solid model that is used to produce a physical object via additive manufacturing, comprising:

through operation of at least one processor:
receiving a solid model, for a physical object to be manufactured, that includes a plurality of boundary representation (b-rep) surfaces;
analyzing the b-rep surfaces to generate point samples for potential support locations;
optimizing the support locations, including clustering points on the solid model, corresponding to at least a portion of the point samples, to create support locations, including identifying a cluster having a plurality of the generated point samples that are on a line for a potential line support, such that only a single one of the identified point samples of the identified cluster is used as a support location for a column support;
generating column supports in the solid model that connect to the original solid model at the support locations;
storing the solid model in at least one storage, including the generated column supports; and
communicating with a 3D printer to print the solid model.

2. The method according to claim 1, wherein the data processing system also interacts with a user to edit the column supports in the solid model, wherein the data processing system also automatically adjusts the column supports according to changes in the solid model.

3. The method according to claim 1, wherein the column supports are shaped to have minimum contact with the solid model at the support locations so that the column supports can be easily removed from the physical object to be manufactured without marring or damaging a surface of the object to be manufactured.

4. The method according to claim 1, wherein the column supports are generated at locations and angles designed to minimize collisions with the solid model and a contact build plate.

5. The method according to claim 1, wherein at least one of the column supports is shaped as a combination of a first cone, a cylinder, and a second cone.

6. A data processing system for generating support structures in a solid model that is used to produce a physical object via additive manufacturing comprising:
a processor; and
an accessible memory, the data processing system particularly configured to
receive a solid model, for a physical object to be manufactured, that includes a plurality of boundary representation (b-rep) surfaces;
analyze the b-rep surfaces to generate point samples for potential support locations;
optimize the support locations, including cluster points on the solid model, corresponding to at least a portion of the point samples, to create support locations, including identify a cluster having a plurality of the generated point samples that are on a line for a potential line support, such that only a single one of the identified point samples of the identified cluster is used as a support location for a column support;
generate column supports in the solid model that connect to the original solid model at the support locations;
store the solid model in at least one storage, including the generated column supports the solid model, including the column supports; and
communicate with a 3D printer to print the solid model.

7. The data processing system of claim 6, wherein the data processing system also interacts with a user to edit the column supports in the solid model, wherein the data processing system also automatically adjusts the column supports according to changes in the solid model.

8. The data processing system of claim 6, wherein the column supports are shaped to have minimum contact with the solid model at the support locations so that the column supports can be easily removed from the physical object to be manufactured without marring or damaging a surface of the object to be manufactured.

9. The data processing system of claim 6, wherein the column supports are generated at locations and angles designed to minimize collisions with the solid model and a contact build plate.

10. The data processing system of claim 6, wherein at least one of the column supports is shaped as a combination of a first cone, a cylinder, and a second cone.

11. A non-transitory computer-readable medium encoded with executable instructions that, when executed, cause one or more data processing systems for generating support structures in a solid model that is used to produce a physical object via additive manufacturing to:
receive a solid model, for a physical object to be manufactured, that includes a plurality of boundary representation (b-rep) surfaces;
analyze the b-rep surfaces to generate point samples for potential support locations;
optimize the support locations, including cluster points on the solid model, corresponding to at least a portion of the point samples, to create support locations, including identify a cluster having a plurality of the generated point samples that are on a line for a potential line support, such that only a single one of the identified point samples of the identified cluster is used as a support location for a column support;
generate column supports in the solid model that connect to the original solid model at the support locations;
store the solid model in at least one storage, including the generated column supports; and
communicate with a 3D printer to print the solid model.

12. The computer-readable medium of claim 11, wherein the data processing system also interacts with a user to edit the column supports in the solid model, wherein the data processing system also automatically adjusts the column supports according to changes in the solid model.

13. The computer-readable medium of claim 11, wherein the column supports are shaped to have minimum contact with the solid model at the support locations so that the column supports can be easily removed from the physical object to be manufactured without marring or damaging a surface of the object to be manufactured.

14. The computer-readable medium of claim 11, wherein the column supports are generated at locations and angles designed to minimize collisions with the solid model and a contact build plate.

* * * * *